Feb. 10, 1970
W. E. BELL
3,495,161
OPTICALLY DRIVEN ATOMIC RESONATOR SYSTEMS
EMPLOYING MEANS FOR MODULATING THE
SENSE OF ROTATIONAL POLARIZATION
OF THE PUMPING LIGHT
Filed Jan. 19, 1967
2 Sheets-Sheet 1
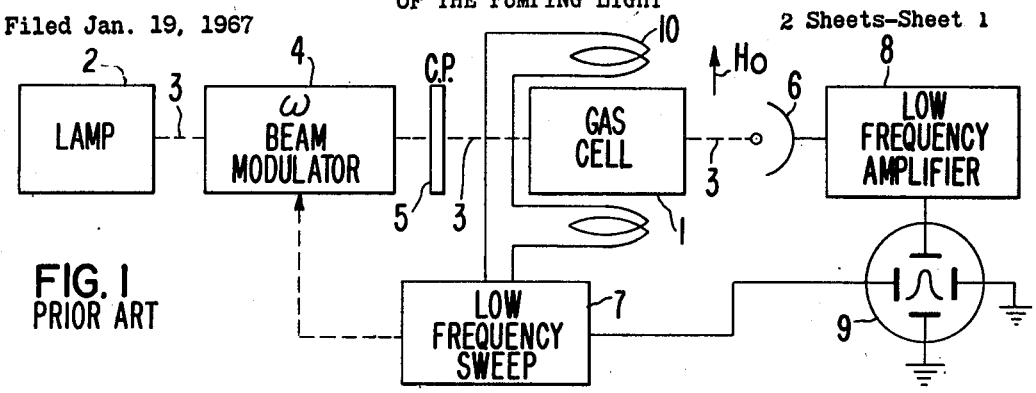
FIG. 1
PRIOR ART
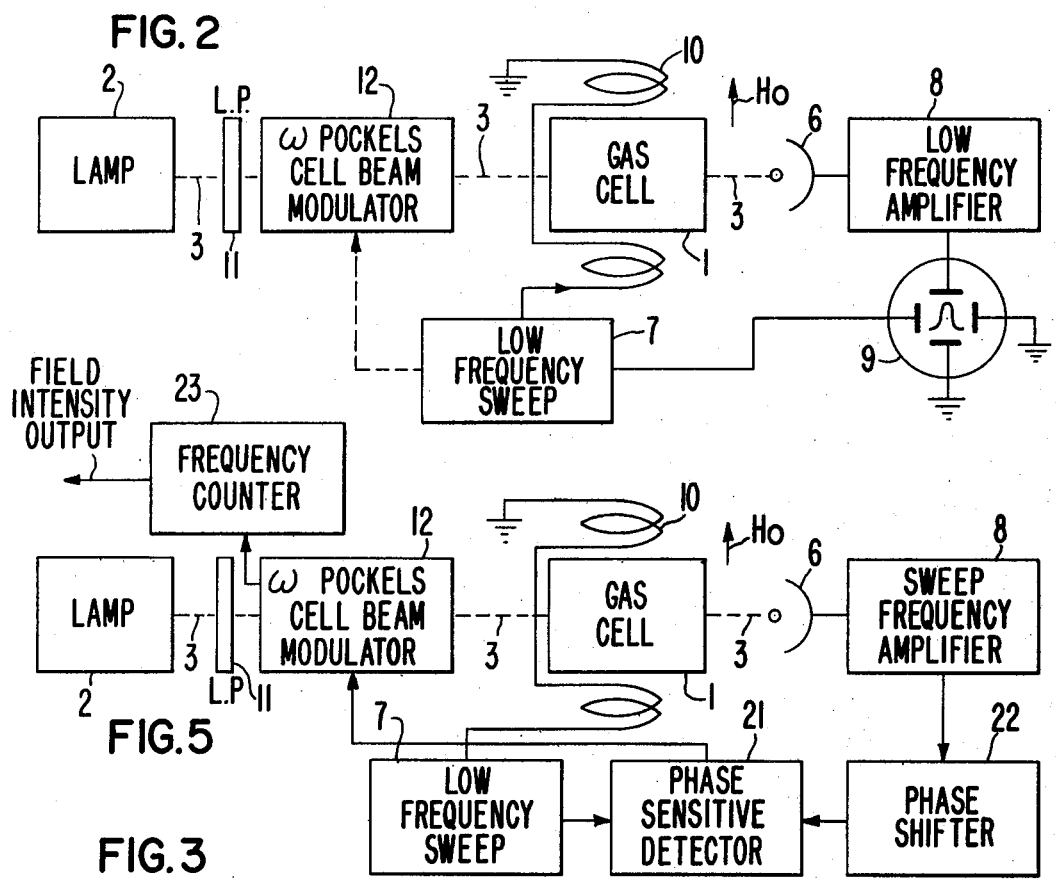
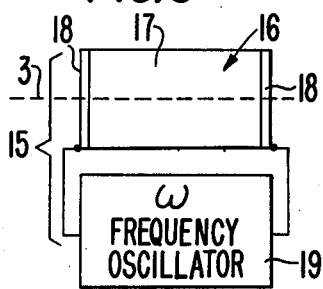
FIG. 3
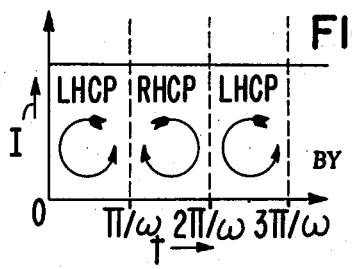
FIG. 4
INVENTOR.
WILLIAM E. BELL
BY
Wm J Nolan
ATTORNEY Feb. 10, 1970
W. E. BELL
3,495,161
OPTICALLY DRIVEN ATOMIC RESONATOR SYSTEMS
EMPLOYING MEANS FOR MODULATING THE
SENSE OF ROTATIONAL POLARIZATION
OF THE PUMPING LIGHT
Filed Jan. 19, 1967
2 Sheets-Sheet 2
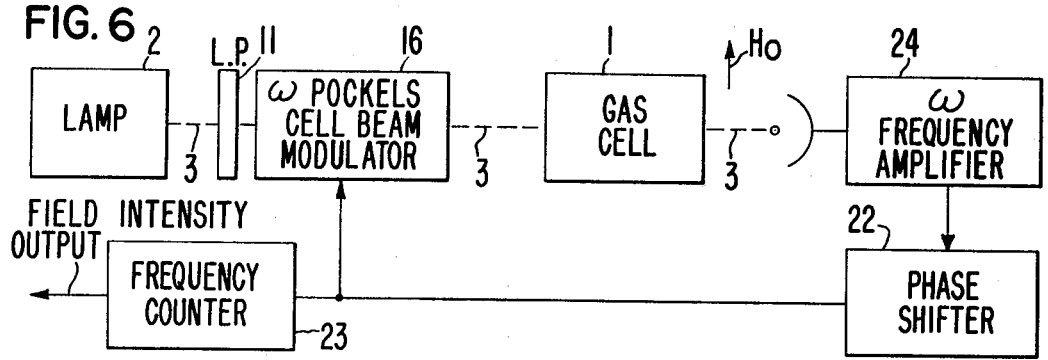
FIG. 6
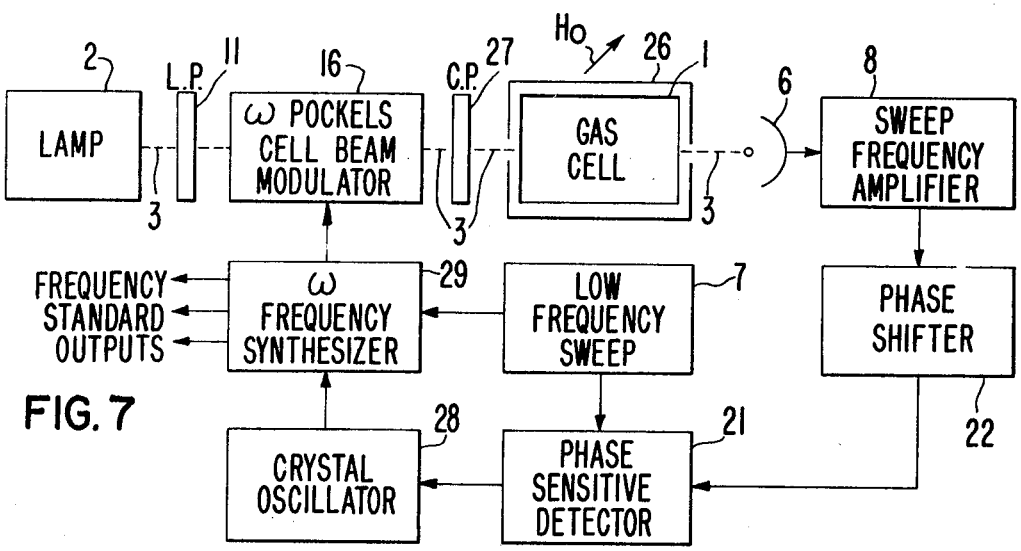
FIG. 7
FIG. 8
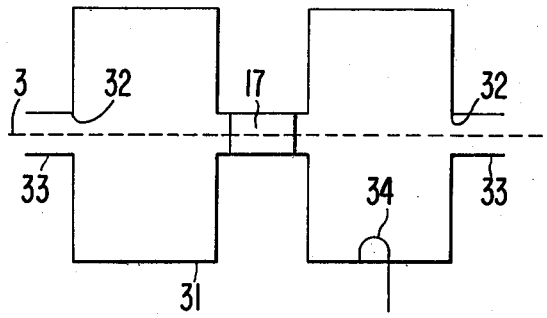
FIG. 9
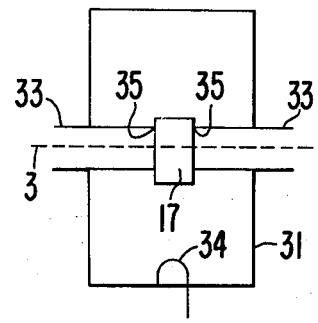
INVENTOR.
WILLIAM E. BELL
BY
ATTORNEY United States Patent Office 3,495,161
Patented Feb. 10, 1970

3,495,161
OPTICALLY DRIVEN ATOMIC RESONATOR SYSTEMS EMPLOYING MEANS FOR MODULATING THE SENSE OF ROTATIONAL POLARIZATION OF THE PUMPING LIGHT
William E. Bell, Jerome, Ariz., assignor to Varian Associates, Palo Alto, Calif., a corporation of California
Filed Jan. 19, 1967, Ser. No. 610,318
Int. Cl. G01r 33/08
U.S. Cl. 324—.5          12 Claims

ABSTRACT OF THE DISCLOSURE

The present invention relates in general to optically driven spin precession of atomic resonator systems, such as employed in atomic frequency standards and atomic vapor magnetometers and, more particularly, to improved systems of this type employing means such as a Pockels cell for modulating the polarization of the driving light of a beam of light between left and right hand rotational polarization at a certain frequency to produce precession of the atomic resonators. In the case of a vapor magnetometer, the alternating left and right hand polarization produces precession of the atomic resonators without intensity modulation of the applied radiation. In the case of the atomic frequency standard, the alternating left and right hand polarized light is passed through a left hand or right hand circular polarizer before application to the atomic resonators for producing either a right hand or left hand circularly polarized wave which is intensity modulated at the certain frequency for driving spin precession of the atoms.

DESCRIPTION OF THE PRIOR ART

Heretofore, spin precession of a system of atomic resonators such as Rb, Cs, He, Hg, K or Na vapor has been produced by driving the system of atomic resonators with optical radiation modulated at a certain frequency, typically the atomic resonant (spin precession) frequency. Such an arrangement is described and claimed in U.S. Patent 3,173,082 issued Mar. 9, 1965, and assigned to the same assignee as that of the present invention.

In the prior atomic vapor magnetometer, the applied optical radiation was modulated in intensity at the precession frequency to produce spin precession (resonance) of the atomic resonators. The resonance of the atomic resonators was detected by a photocell monitoring the absorption of the applied radiation by the precessing atomic resonators. The absorption was detected by monitoring the intensity of a beam of light passing through the atomic vapor to the photocell. The precessing atoms modulate the intensity of the light, as monitored by the photocell, at the precession frequency and at harmonics thereof. However, detection of the precession absorption component in the detected light signal is very difficult because this signal is masked by the applied intensity modulation of the light at this frequency, which applied modulation was necessary to produce precession of the atoms. Therefore, it was proposed to employ the second harmonic of the detected precession signal and to divide this signal by two and feed it back to the light intensity modulator to provide sustained precession of the atoms. This scheme has its difficulties as well.

In the case of the atomic frequency standard, the intensity modulation of the driving optical radiation is typically at a much higher frequency corresponding to a field independent hyperfine resonance transition. It was proposed to modulate the intensity of the driving light by means of a Kerr cell or by modulating the intensity of the R.F. excited lamp, which lamp served as the source of optical radiation. However, it is difficult to use these means for continuously modulating the intensity of the optical radiation at frequencies high enough to reach many of the hyperfine frequencies which can range between 252 mHz. for potassium 41 and 9193 mHz. for cesium.

SUMMARY OF THE INVENTION

In the present invention, means such as a Pockels cell is provided for moduating the sense of the circular polarization of a beam of optical pumping radiation at a frequency to produce spin precession of an atomic resonator system. Such a modulator is capable of operating up to frequencies including the hyperfine resonance frequencies.

In the case of an atomic vapor magnetometer, the circular polarization modulator modulates the sense of the circular polarization of the optical radiation applied to the atomic vapor. The modulation frequency is chosen at a frequency to produce spin precession of the atomic resonators at a frequency dependent upon the magnitude of the magnetic field in the atomic vapor. The spin precession of the atomic resonators is detected by monitoring spin precession amplitude modulation of the optical radiation passing through the vapor. The spin precession frequency is detected and serves as a measure of the magnetic field intensity. A major advantage of a Pockels cell modulator is that the intensity of the applied optical radiation need not be modulated to produce spin precession, thereby facilitating detection of the intensity modulation of the transmitted portion of the applied radiation due to spin precession of the atomic resonators. In other words, the spin precession modulation of the monitored light is not masked by pre-modulating the intensity of the applied optical radiation to produce the spin precession.

In a preferred embodiment of the magnetometer of the present invention, a detected spin precession signal component of the monitored light is fed back to the rotational polarization modulator (Pockels cell) for modulating the polarization of the applied optical radiation at a frequency to produce self-sustaining spin precession of the atomic resonators. The spin precessions are, thus, self-sustaining at a frequency dependent upon the intensity of the magnetic field. A measure of this frequency is a measure of the magnetic field.

In an atomic frequency standard embodiment of the present invention, the applied optical radiation is intensity modulated at the hyperfine resonance frequency, because the atomic resonators do not possess a magnetic polarization that can be coupled to merely by modulating the sense of the polarization of the applied radiation. However, the circular polarization modulator, such as the Pockels cell, is converted into an intensity modulator by passing its output through either a left hand or right hand circular polarizer, thereby chopping the light into pulses of constant intensity of only one sense of polarization, such pulses occurring at the modulation frequency. Hyperfine resonance of the atomic vapor is detected and used to control the output frequency of the standard.

The advantage of the intensity modulator employing the Pockels cell as a component is that it readily permits continuous intensity modulation of the applied optical radiation at the relatively high frequencies of the hyperfine resonance transitions. Prior Kerr cells tend to overheat during prolonged continuous operation at microwave frequencies.

The principal object of the present invention is the provision of improved optically driven atomic resonator systems.

One feature of the present invention is the provision of a modulator for modulating the optical radiation applied to a system of atomic resonators at a frequency to produce spin precession of the atomic resonators, such modulator including means such as a Pockels cell for modulating the sense of the circular polarization of the beam of optical radiation, whereby relatively high modulation frequencies are readily obtained.

Another feature of the present invention is the same as any one or more of the preceding features wherein the applied optical radiation is modulated at a driving frequency to produce a magnetic field dependent spin precession and the applied optical radiation, which drives the spin precession, is modulated at the driving frequency essentially only as to its sense of circular polarization and not intensity, whereby intensity modulation of the applied radiation by the precessing spin system is more easily detected.

Another feature of the present invention is the same as the preceding feature wherein the intensity modulation of the applied radiation by the precessing spin system is detected and fed back to drive the rotational polarization modulator such as a Pockels cell, whereby a self-sustaining spin precession magnetometer is obtained.

Another feature of the present invention is a modulator for modulating the intensity of optical radiation including a modulator for modulating the sense of circular polarization of optical radiation and a circular polarizer of either left hand or right hand sense operable upon the output of the circular polarization modulator, whereby the output of the circular polarizer is intensity modulator optical radiation.

Another feature of the present invention is the provision of a frequency standard employing a system of atomic resonators and wherein a field independent hyperfine spin precession of the atomic resonators is produced by the intensity modulator of the immediately preceding feature.

Other features and advantages of the present invention will become apparent upon a perusal of the following specification taken in connection with the accompanying drawings wherein:

DESCRIPTION OF THE DRAWINGS

FIG. 1 is a schematic block diagram of a prior art optically driven spin precession system of atomic resonators, FIG. 2 is a schematic block diagram of an optically driven spin precession system of atomic resonators employing features of the present invention, FIG. 3 is a schematic diagram of a Pockel cell modulator, FIG. 4 is a plot of optical radiation intensity versus tune for the output of the modulator of FIG. 3, FIG. 5 is a schematic block diagram of a vapor magnetometer employing features of the present invention, FIG. 6 is a schematic block diagram of a vapor magnetometer employing features of the present invention and being characterized by producing self-sustaining oscillation at the spin precession frequency, FIG. 7 is a schematic block diagram of an atomic frequency standard employing features of the present invention, FIG. 8 is a schematic line diagram of a high frequency Pockels cell modulator, and FIG. 9 is a schematic line diagram of an alternative Pockels cell to that depicted in FIG. 8.

DESCRIPTION OF THE PREFERRED EMBODIMENT

Referring now to FIG. 1, there is shown a prior art optically driven spin precession system of atomic resonators. More particularly, an optically transparent gas cell 1 contains an atomic vapor (gas) at low pressure. Suitable atomic vapors include Cs, Rb, Na, K, Hg and He. Preferably, the active atomic vapor is buffered by being mixed with an inert gas such as $N_2$, A, etc.

A lamp 2 produces a beam 3 of optical pumping radiation for pumping the active atomic vapor inside the gas cell 1 to a non-equilibrium energy level from which spin precession may be induced. A beam modulator 4, such as a non-biased liquid Kerr cell, modulates the intensity of the optical pumping radiation as applied to the gas cell 1. A circular polarizer 5 circularly polarizes the optical pumping radiation as applied to the gas cell 1.

An optical detector 6, such as a photocell, is disposed at the terminal end of the optical beam path 3 for monitoring the intensity of the beam 3 after it passes through the gas cell 1. A magnetic field $Ho$ permeates the gas cell 1 and the beam 3 is applied in such a direction that a substantial component of the magnetic field is perpendicular to the direction of the beam 3.

The magnetic field $Ho$ splits the energy levels of the atomic resonators into Zeeman sublevels. Spin precessions, corresponding to magnetic field dependent Zeeman transitions, are produced by pulsing the intensity of the pumping light at the spin precession (Larmor) frequency. The pulsing light builds up a large net precessing spin polarization which absorbs just enough light each cycle to maintain precession. The pumping light is off when it might tend to destroy the net polarization. The transmitted light, as detected by the photo detector, will be a maximum when the light is pulsating at the spin precession (Larmor) frequency.

A low frequency sweep generator 7 at a frequency of, for example, 100 Hz. modulates the intensity of the magnetic field $Ho$ via coils 10, thereby causing the spin precession conditions to vary at the low sweep frequency. Thus, the detected light intensity is modulated at the sweep frequency. The detected light signal is amplified by low frequency amplifier 8 and fed to one set of plates of an oscilloscope 9. The sweep frequency is fed to the other set of oscilloscope plates to produce a typical resonance envelope signal display on the oscilloscope. As an alternative, the low frequency sweep could have swept the modulation frequency $\omega$ about the center spin precession frequency to produce the same type of output signal on the oscilloscope 9.

In this prior art system, the precessing spin polarization absorbs optical radiation from the beam once each cycle of its precession. The amount of absorbed radiation decreases to a minimum when the modulation frequency is precisely at the spin precession frequency. This absorption component, at the spin precession frequency, is difficult to detect in the prior art system of FIG. 1 because the beam is already intensity modulated at the spin precession frequency by the modulator 4. Thus, the small absorption signal at this same frequency is masked by the already existing modulation.

Referring now to FIG. 2, there is shown an atomic resonant apparatus similar to that of FIG. 1 but incorporating features of the present invention. The apparatus is identical to that of FIG. 1 except that the beam modulator 4 and circular polarizer 5 are replaced by a linear polarizer 11 and a Pockels cell beam modulator 12. The Pockels cell is excited at the spin precession (Larmor) frequency $\omega$ and operates upon the linear polarized optical beam 3 to convert the linear polarized optical radiation into circular polarized radiation. In addition, the Pockels cell modulates the sense of circular polarization of the beam 3 at the modulation frequency $\omega$. Thus, the beam output of the Pockels cell is characterized by a constant intensity which alternates between left hand and right hand circular polarization each half cycle, as shown in FIG. 4.

It was pointed out in the aforecited Patent 3,173,082 that if the circular polarization of the applied optical pumping radiation were modulated between left and right hand polarization at the spin precession frequency that a substantial increase in detected spin precession signal is obtained.

One advantage of the system of FIG. 2 over that of the prior art is that the intensity of the applied radiation is not necessarily modulated to produce the pin precessions. As a consequence, it is much easier to detect the spin precession absorption of the transmitted light at the spin precession frequency ω since under the conditions the only substantial intensity modulation of the beam, at the spin precession frequency, is due to the optical absorption by the precessing spin polarization.

Another advantage of the apparatus of FIG. 2 over the prior art is that the Pockels cell is capable of modulating the sense of polarization of the beam 3 to much higher frequencies than other types of previously proposed beam intensity modulators.

Although the apparatus of FIG. 2 has been described employing a Pockels cell for modulating the sense of the rotational polarization of the light beam, other devices such as specially electrically biased Kerr cells and non-biased solid state Kerr cells may be employed. The term "Pockels" cell as used herein is defined to include such Kerr cells and Pockels cells that produce rotational polarization of the light beam.

Referring now to FIG. 3 there is shown a Pockels cell modulator 15. The modulator 15 includes a Pockels cell 16 comprising a section of piezoelectric material 17 such as, for example, single crystals of potassium dihydrogen phosphate or potassium didenterium phosphate which are available from Harshaw Chemical Co., Inc. of Cleveland, Ohio. Optically transparent conductive electrodes 18 are formed at the ends of the crystal section 17. An oscillator 19 is connected across the electrodes 18 for driving the crystal 17 at the modulation frequency ω. In operation, the crystal delays the phase of one of the circular rotating components of the linearly polarized optical radiation by 90°, thereby producing circular polarized output of one sense. On the opposite half cycle of the applied voltage, the other rotating component of the linearly polarized radiation is delayed by 90° thus, producing circular polarized output of the opposite sense.

Alternatively, the Pockels cell 16 may be replaced by a solid state Kerr cell which would have substantially the same geometry as that of FIG. 3 with the exception that the electrodes 18 are placed on the sides of the Kerr cell crystal body instead of on the ends thereof to produce an alternating field at right angles to the beam 3. Suitable solid state Kerr cell crystals include potassium niobate, potassium tantalate, barium titanate and potassium lithium niobate. Also liquid Kerr cells may be employed for the beam modulator provided they are electrically biased to a value to produce an integral half wavelength delay of the delayed light component in traversing the cell. The most common liquid Kerr cell material is liquid nitrobenzene.

Referring now to FIG. 5, there is shown an atomic vapor magnetometer incorporating features of the present invention. More specifically, the apparatus is similar to that of FIG. 2 except that the sweep frequency output signal component, in the output of sweep frequency amplifier 8, is fed to one input of a phase sensitive detector 21 via phase shifter 22. A sweep frequency reference signal is fed to the other input of the phase sensitive detector 21. The output of the phase sensitive detector 21 is a D.C. signal having a phase and amplitude proportional to the difference between the beam modulation frequency ω and the field dependent spin precession (Larmor) frequency of the atomic resonators. The output of the phase sensitive detector serves as an error signal which is fed to a tuner of the beam modulator 12 for correcting the modulation frequency to the spin precession frequency. The spin precession frequency is measured by feeding a portion of the beam modulation frequency ω to a frequency counter 23 which counts the frequency and gives an output determinative of the magnetic field intensity $H_o$.

Referring now to FIG. 6 there is shown an alternative vapor magnetometer apparatus incorporating features of the present invention. In this embodiment, the output signal component of the photodetector 6, which is at the spin precession frequency ω, is amplified by amplifier 24 and fed back via variable phase shifter 22 to drive the Pockels cell 16. The phase of the feedback is adjusted via phase shifter 22 to obtain self-sustaining oscillation or spin precession of the atomic resonators in the magnetic field $H_o$. The spin precession frequency is sampled and fed to the frequency counter 23 to yield a measurement of the magnetic field intensity.

Use of the Pockels cell modulator 16, in the self-sustaining spin precession magnetometer of FIG. 6, is especially desirable since the Pockels cell does not introduce any intensity modulation components. Such components would otherwise interfere with detection of the spin precession absorption signal components in the signal, as picked up by the photodetector 6.

Referring now to FIG. 7, there is shown an atomic frequency standard employing features of the present invention. The apparatus is similar to that previously described with regard to the magnetometer apparatus of FIG. 5 in that it is an apparatus wherein the center of the beam modulation frequency ω is locked to spin precession frequency ω by means of a low frequency sweep which sweeps the spin precession conditions at a low sweep frequency to derive a frequency control signal. However, in the apparatus of FIG. 7, the spin precessions are at a much higher frequency corresponding to a field independent hyperfine transition such as, for example, 6.88 gHz. for Rb vapor and 9.193 gHz. for Cs vapor.

Moreover, the gas cell 1 is preferably shielded from the earth's magnetic field by a magnetic shield 26 to some suitable low field intensity such as 20 μg. in order to eliminate second order frequency pulling of the spin precession frequency. Also, since a field independent transition is used the modulated pumping light will not be coupled to a magnetic polarization of the spins. As a consequence, the beam of light is directed such that the magnetic field $H_o$ within the gas cell 1 has a substantial component parallel to the direction of the beam 3. A suitable orientation is 45° between the direction of the beam 3 and the direction of the weak field $H_o$, as of 100 μg. Also, since a magnetic spin polarization is not employed, reversing the sense of rotational polarization of the pumping light each half cycle of the spin precession frequency will not produce spin precession. Instead, the beam 3 must be intensity modulated at the spin precession frequency.

An especially suitable beam intensity modulator is obtained by passing the modulated beam output of the Pockels cell 16 through either a left hand or right hand circular polarizer 27. The circular polarizer will block out the one half cycle of the light which does not have its sense of rotational polarization, thereby intensity modulating the beam at the modulation frequency of the Pockels cell 16.

A crystal oscillator 28 serves to provide a stable source of oscillations at a convenient low frequency such as 5 mHz. The crystal oscillator output is fed to a frequency synthesizer 29 which synthesizes the field independent hyperfine precession frequency ω for driving the Pockels cell beam modulator 16. The frequency synthesizer 29 also converts the crystal oscillator signal into more convenient output frequency signals at, for example, 100 kHz., 1 mHz., and 5 mHz.

The low frequency sweep generator 7 serves to sweep the frequency of the Pockels cell driving signal above and below the spin precession frequency at some convenient low frequency such as 100 Hz. This produces a low frequency sweep component in the detected spin precession signal output of the photodetector 6. The low frequency component is amplified by amplifier 8 and fed to one input of the phase detector 21 where it is compared with the low frequency sweep signal derived from the sweep generator 7. The adjustable phase shifter 22 permits proper adjustment of the relative phases of the two compared sweep frequency signals to produce a D.C.

output which is fed to the crystal oscillator 28 to correct the tuning of the crystal oscillator 28 such that the center frequency of the synthesized spin precession signal is precisely at the spin precession frequency of the atomic resonators. In this manner, the frequency standard outputs are frequency or phase locked to the atomic resonators.

The Pockels cell 16, in combination with the circular polarizer 27, provides an especially desirable beam intensity modulator as it readily permits operation at modulation frequencies in the gHz. region which modulation is very difficult to obtain by other means.

Although the beam modulator 16 has been described as operating at the field independent hyperfine resonant frequency, in an alternative embodiment, the beam modulator 16 is operated at a neoharmonic of the hyperfine resonance frequency.

Referring now to FIGS. 8 and 9, there are shown Pockels cell circuits for use at high microwave frequencies such as the 2 to 20 gHz. range. More particularly, in FIG. 8 the Pockels cell crystal 17 is of the type which permits the modulating electric field to be applied transversely to the optical beam path 3. The crystal is positioned in the gap of a re-entrant toroidal cavity resonator 31. Beam holes 32 are provided in the opposite side walls of the cavity resonator 31 for passage of the beam therethrough. Tubes 33 of transverse dimensions below cut off at the spin precession frequency ω are aligned with the beam path 3 to prevent loading of the cavity 31 by the beam holes 32. An input coupling loop 34 serves as means for coupling the synthesized modulation signal ω into the cavity 31. The cavity 31 is tuned to the modulation frequency ω.

In FIG. 9, the Pockels cell crystal 17 is of the type wherein the modulating field is applied in a direction parallel to the optical beam path 3. The beam holes 35 are positioned in opposed re-entrant portions of the cavity 31. Tubes 33 are aligned with the beam path 3 and are below cut off to prevent loading of the cavity resonator 31.

The schematic circuit diagrams used herein have been simplified for sake of explanation. Specifically the various optical pumping schemes and devices are not depicted in detail as such devices are deemed well known. For example, optical pumping of Rb vapor typically employs a hyperfine Rb 85 filter cell and pumping of He typically employs means for exciting an electron discharge inside the gas cell 1.

What is claimed is:

1. An atomic resonant apparatus including, means forming a system of atomic resonators, means for producing a beam of optical radiation of a wavelength to produce optical pumping of the system of atomic resonators, means for modulating the sense of rotational polarization of the beam of optical pumping radiation and applying the modulated radiation to said system of atomic resonators, the frequency of the modulation of the applied radiation being of a certain frequency to produce spin precession of the atomic resonators, and means for detecting spin precession of the atomic resonators.

2. The apparatus of claim 1 wherein said means for detecting spin precession of the atomic resonators produces an output signal at the spin precession frequency, and means forming a feedback path for feeding the detected spin precession signal to said rotational polarization modulator means for modulating the beam of applied optical radiation at the spin precession frequency to produce self-sustained precession of the atomic resonant system.

3. The apparatus of claim 1 wherein the spin precessions of the atomic resonators are magnetic field dependent spin precessions.

4. The apparatus of claim 1 wherein the spin precessions of the atomic resonators are magnetic field independent hyperfine spin precessions.

5. The apparatus of claim 4 including means forming a rotational polarizer having only one sense of polarization disposed in the path of modulated optical pumping radiation between said rotational polarization modulator means and said system of atomic resonators for converting the polarization modulation of the optical radiation to intensity modulation to produce intensity modulation of the applied radiation at the certain modulation frequency.

6. The apparatus of claim 2 wherein said means for detecting the spin precessions and producing an output at the spin precession frequency includes a photo sensitive detector responsive to the optical pumping radiation which has passed through said spin precessing atomic resonators.

7. The apparatus of claim 1 including means for modulating the spin precessions of said atomic resonators at a second frequency substantially lower than the spin precession frequency, means for detecting the lower frequency modulation of the spin precessions, and means responsive to the detected lower frequency modulation components for maintaining the higher frequency of the optical pumping modulation at the correct center frequency to produce spin precession of the atomic resonators.

8. The apparatus of claim 7 wherein the atomic resonant apparatus is a frequency standard and the spin precessions are at a magnetic field independent hyperfine resonance frequency of the atomic resonators, and including means for deriving an output frequency for the frequency standard which is stabilized by means of signals derived from the field independent hyperfine spin precessions of the atomic resonators.

9. A method of producing spin precessions of a system of atomic resonators comprising the steps of irradiating the atomic resonators with rotationally polarized optical pumping radiation, modulating the sense of rotational polarization of the applied optical pumping radiation at a certain frequency to produce spin precessions of the atomic resonators, detecting spin precession of the system of atomic resonators, and maintaining the intensity of the modulated applied optical pumping radiation substantially constant at the certain modulation frequency.

10. The method of claim 9 including the steps of detecting the optical pumping radiation which has passed through the said system of atomic resonators.

11. The method of claim 9 wherein the optical pumping radiation is applied in the form of a beam which is directed at a substantial angle to a unidirectional magnetic field within the system of atomic resonators.

12. The apparatus of claim 1 wherein said rotational polarization modulator means is a Pockels cell.

References Cited

UNITED STATES PATENTS

| | | | |
|---|---|---|---|
| 2,705,903 | 4/1955 | Marshall | 350—150 |
| 3,122,702 | 2/1964 | Franken | 324—0.5 |
| 3,173,082 | 3/1965 | Bell | 324—0.5 |
| 3,187,251 | 6/1965 | Bell | 324—0.5 |
| 3,239,671 | 3/1966 | Buhrer | 350—150 |
| 3,252,081 | 5/1966 | Ruddock | 324—0.5 |
| 3,257,608 | 6/1966 | Bell | 324—0.5 |

RUDOLPH V. ROLINEC, Primary Examiner

M. J. LYNCH, Assistant Examiner

U.S. Cl. X.R.

331—3